United States Patent
Finkelstein et al.

(10) Patent No.: US 11,100,544 B1
(45) Date of Patent: Aug. 24, 2021

(54) IMAGE-BASED ITEM REVIEWS

(71) Applicant: Amazon Technologies, Inc., Seattle, WA (US)

(72) Inventors: Adam James Finkelstein, Seattle, WA (US); Ho Nam Ho, Seattle, WA (US); Markus Wai-Keen Kwok, Seattle, WA (US); Siqi Zhao, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 765 days.

(21) Appl. No.: 14/980,556

(22) Filed: Dec. 28, 2015

(51) Int. Cl.
| | |
|---|---|
| *G06Q 30/02* | (2012.01) |
| *G06K 9/62* | (2006.01) |
| *G06K 9/46* | (2006.01) |
| *G06F 16/51* | (2019.01) |
| *G06F 16/583* | (2019.01) |

(52) U.S. Cl.
CPC ......... *G06Q 30/0282* (2013.01); *G06F 16/51* (2019.01); *G06F 16/583* (2019.01); *G06K 9/4604* (2013.01); *G06K 9/6267* (2013.01)

(58) Field of Classification Search
CPC .......... G06F 17/30247; G06F 17/3028; G06F 16/583; G06F 16/51; G06Q 30/0282; G06K 9/4604; G06K 9/6267
USPC ........................................................ 707/736
See application file for complete search history.

(56) References Cited

U.S. PATENT DOCUMENTS

| | | | |
|---|---|---|---|
| 7,933,972 B1 | 4/2011 | Issa et al. | |
| 9,449,080 B1* | 9/2016 | Zhang | G06F 16/3331 |
| 2004/0201752 A1* | 10/2004 | Parulski | H04N 1/00188 |
| | | | 348/231.99 |
| 2004/0267639 A1* | 12/2004 | McIntyre | H04N 1/00135 |
| | | | 705/26.41 |
| 2007/0236729 A1 | 10/2007 | Yoda | |
| 2013/0030945 A1* | 1/2013 | Polt | G06Q 20/12 |
| | | | 705/26.5 |
| 2013/0283301 A1* | 10/2013 | Avedissian | H04N 21/4756 |
| | | | 725/5 |
| 2013/0339338 A1 | 12/2013 | Reddy et al. | |
| 2014/0079322 A1 | 3/2014 | Yamaji et al. | |

(Continued)

OTHER PUBLICATIONS

Office Action for U.S. Appl. No. 14/980,434, dated Mar. 8, 2018, Finkelstein, "Image-Based Search Results", 18 pages.

(Continued)

*Primary Examiner* — Mohammad S Rostami
*Assistant Examiner* — Saba Ahmed
(74) *Attorney, Agent, or Firm* — Lee & Hayes, P.C.

(57) ABSTRACT

A service may create image-based reviews, which include minimal or no text, to assist customers in researching products. The reviews may include images sorted or grouped (e.g., by sentiment, by product review rating, by age of item, by number of uses, etc.). Images of items may be obtained by the service from user reviews and/or other sources. The images may be associated with text, such as at least some text from associated reviews, commentary, and/or other metadata. The images may be analyzed by a classifier to identify features in the visual image, such as a location of a particular item. The images may be categorized for use in one or more user interfaces that provide image-based item reviews. In some embodiments, the images may be arranged based on a number of uses of the item in the image or by an item age of the item in the image.

20 Claims, 12 Drawing Sheets

(56) References Cited

U.S. PATENT DOCUMENTS

| | | | |
|---|---|---|---|
| 2014/0080428 A1* | 3/2014 | Rhoads | H04W 4/025 |
| | | | 455/88 |
| 2014/0344293 A1 | 11/2014 | Yamahara | |
| 2015/0220567 A1 | 8/2015 | Folkens et al. | |
| 2016/0092959 A1 | 3/2016 | Gross | |
| 2016/0171584 A1* | 6/2016 | Cao | G06Q 30/0282 |
| | | | 705/26.62 |
| 2016/0217522 A1 | 7/2016 | Jnagal et al. | |

OTHER PUBLICATIONS

Office Action for U.S. Appl. No. 14/980,434, dated Jun. 29, 2018, Finkelstein, "Image-Based Search Results", 21 pages.

* cited by examiner

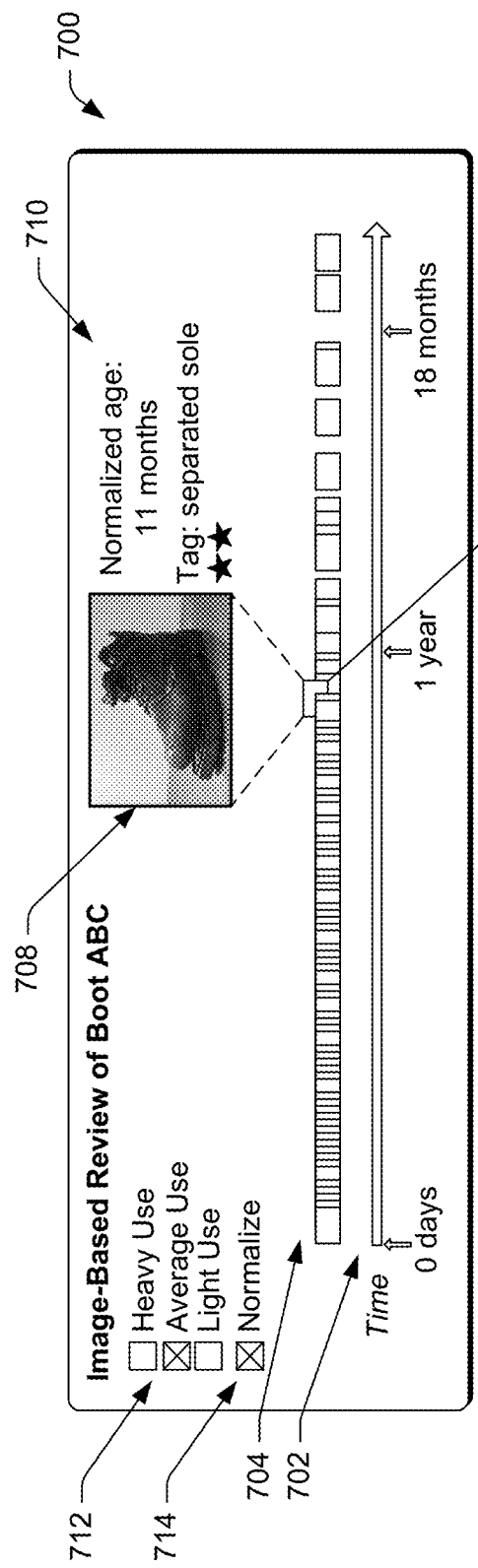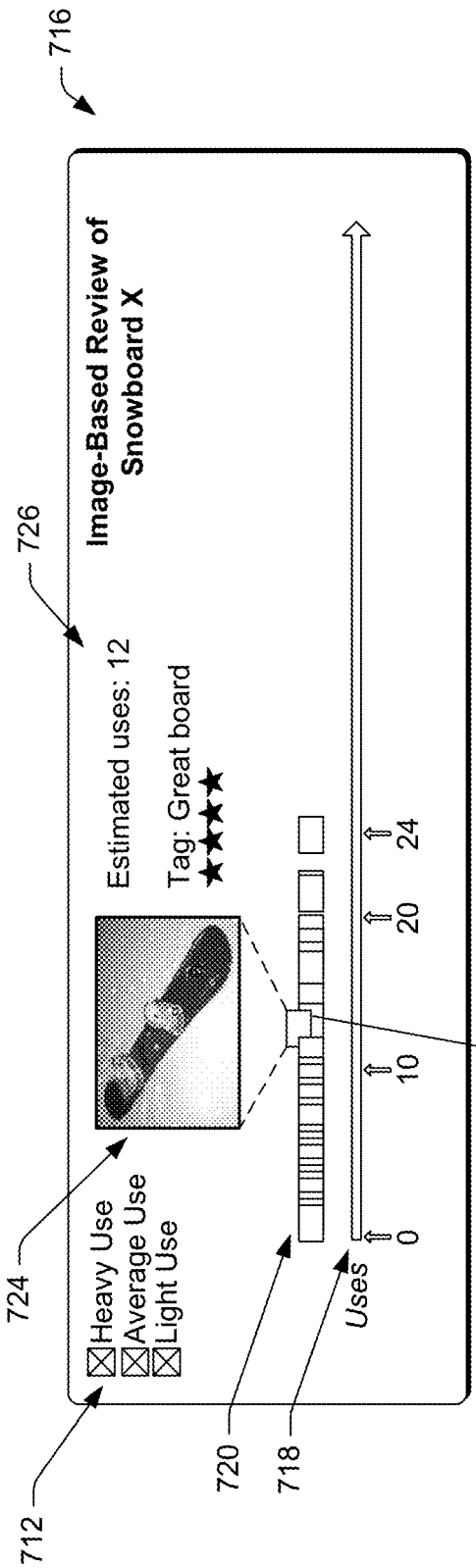

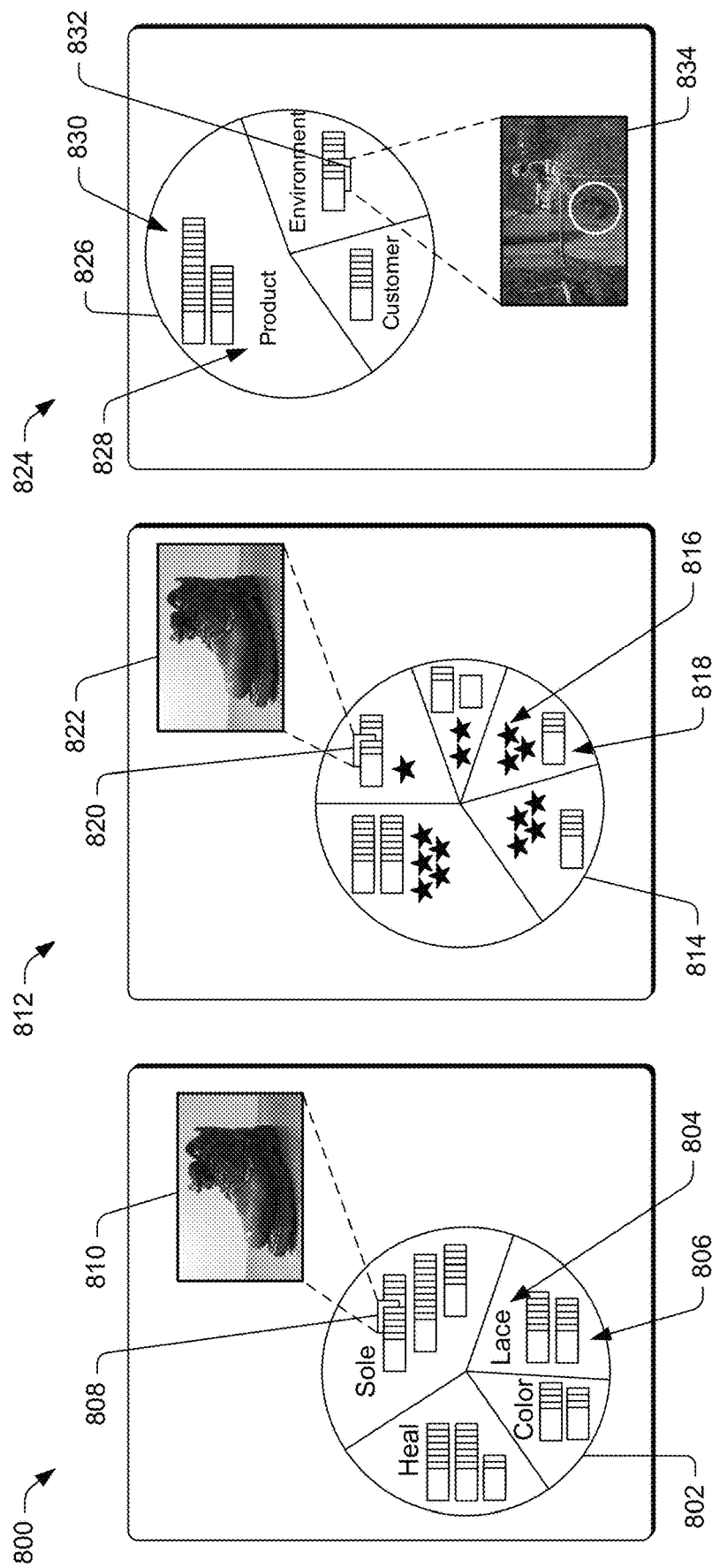

IMAGE-BASED ITEM REVIEWS

BACKGROUND

Many items are purchased from electronic marketplaces. One advantage of using electronic marketplaces is an ability to access information about items which may not be readily available at counterpart brick-and-mortar retailers, such as user review information. User review information may provide potential customers with valuable information that can better inform their buying decisions. In particular, user reviews may inform potential customers about the quality of an item over time, such as by providing a textual description of positive and negative aspects of the item experienced over time after use by the user.

However, user reviews do have some drawbacks. First, they are time consuming to read and are sometimes written in a confusing or ambiguous manner. When many user reviews are available, the quantity of reviews may be overwhelming for a reader since the reader may not have time to read all of the user reviews or even time try to find user reviews that are relevant to the user.

Some user review resources enable users to upload images for inclusion in the user reviewers. Although helpful, these images are not easily accessible, but are often buried in the user reviews and may be missed by potential customers who could benefit from viewing certain images. Further, it may be difficult for a viewer to extract some information from an image, such as when the item is not a primary subject of the image.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIGS. 7A and 7B show illustrative user interfaces (UIs) that include images arranged in association with a timeline or arranged by a number of uses, respectively.

FIGS. 8A-8C show illustrative UIs that includes images arranged by different categories and enable users to explore the images in each category. FIG. 8A shows an illustrative UI including images arranged by condition of an item, FIG. 8B shows an illustrative UI including images arranged by a rating or sentiment associated with the item, and FIG. 8C shows an illustrative UI including images arranged by a subject of the image.

DETAILED DESCRIPTION

This disclosure is directed to leveraging images to provide more meaningful item reviews using image-based reviews. A service provider may collect and process images that are associated with products sold by an electronic merchant, which may or may not be associated with the service provider.

In various embodiments, images of items may be obtained by the service provider from user reviews and/or other sources, such as from social network posts, from commercial repositories, from message boards, from product testers, and so forth. The images may be associated with text, such as at least some text from associated reviews, commentary, and/or other metadata. The images may be analyzed by a classifier to identify features in the visual image, such as a location of a particular item.

The images may be modified to improve visibility of the item, such as by modifying colorization, brightness, contrast, and/or other image attributes. The modifications may include adding a marker to indicate a location of the item or a feature of the item in the image. In some instances, images may be cropped to remove extraneous imagery.

The images may be categorized for use in one or more user interfaces that provide image-based item reviews. In some embodiments, the images may be arranged based on a number of uses of the item in the image or by an item age of the item in the image. The number of uses and/or item age may be determined based on text associated with the image and/or other clues (data) associated with the image, such as a date of upload of the image by a user, a date the user purchased the item, and so forth. In various user interfaces, the images may be sorted by categories, such as by different conditions associated with an item featured in the images, by user sentiment, by ratings associated with reviews of the items, and/or using other categories or information. In various embodiments, the images may be used to create an image-based review that includes little or no text. By providing the images to the user with little or no text, the user may quickly scan through many images to get an impression of the product from the images, which may be sorted or grouped in a particular manner (e.g., by sentiment, by product review rating, by age of item, by number of uses, etc.). Thus, a user may quickly extract information from hundreds of reviews or more by just viewing organized images from the reviews and/or from other sources of images.

The techniques and systems described herein may be implemented in a number of ways. Example implementations are provided below with reference to the following figures.

Figure 1:
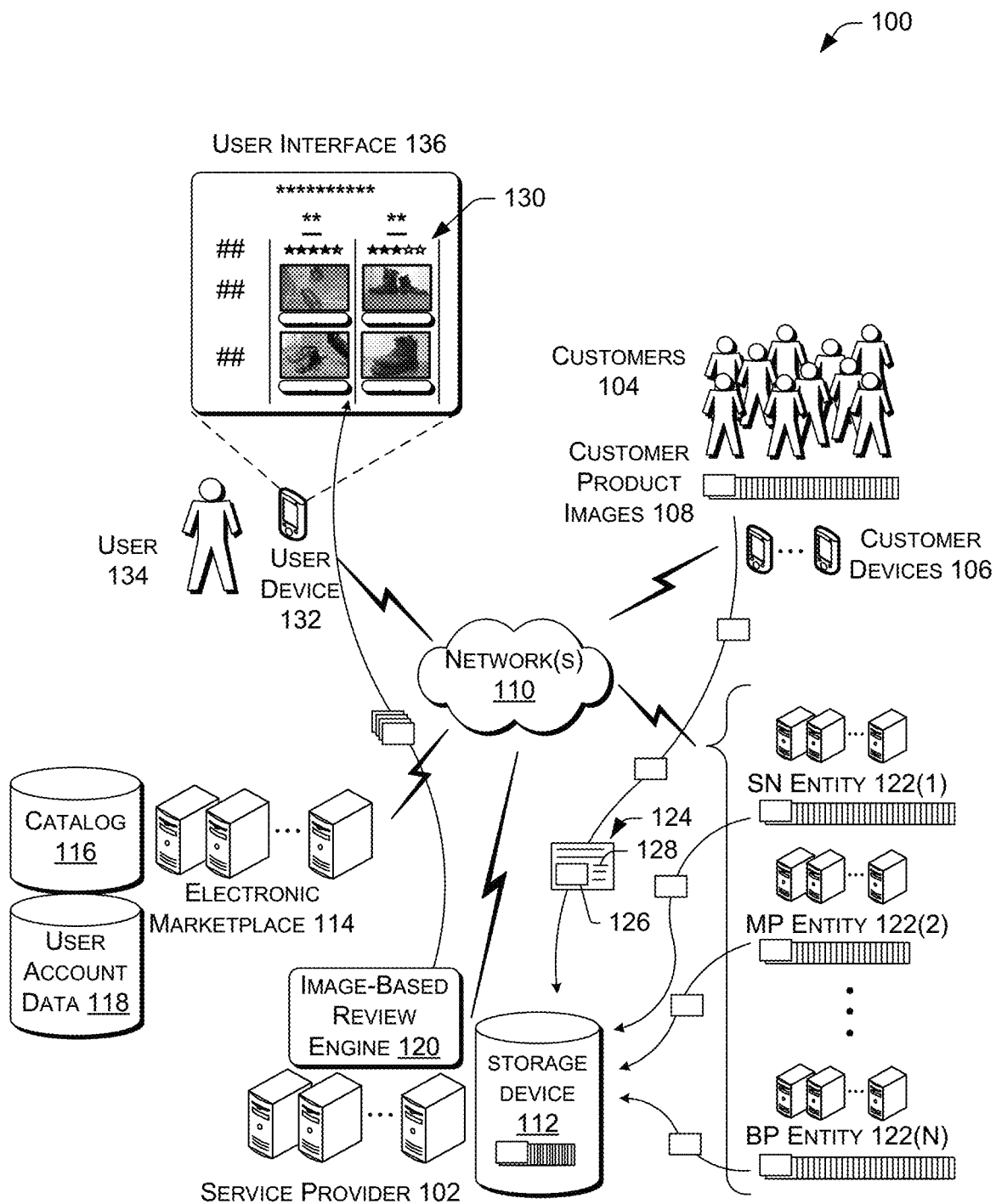
FIG. 1 is a schematic diagram of an illustrative environment to collect images of items and organize the images to generate image-based item reviews.

FIG. 1 is a schematic diagram of an illustrative environment 100 to collect images of items and organize the images to generate image-based item reviews. The environment 100 includes a service provider 102 that communicates with customers 104, via customer devices 106, to facilitate collection of customer product images 108 (possibly along with text reviews or other text information) and exchange of at least some of the images between the customers and/or other users (e.g., prospective customers, etc.). The communications may be provided through one or more networks 110, which may include wired and/or wireless network(s).

The service provider 102 may store the customer product images in a storage device 112, possibly along with the text reviews and/or other text information. The customer product images may be images uploaded to the service provider 102, possibly via an electronic marketplace 114, by the customers along with reviews and/or other textual information. The images may be associated with a known product, such as a product purchased from the electronic marketplace 114, a product that is a subject of a review authored by the customer, a product that is subject of a message post, and/or otherwise associated with a product. The service provider 102 may be the same entity that provides the electronic marketplace 114 or may be separate from the electronic marketplace 114. The electronic marketplace 114 may have a catalog of items 116 offered for consumption to the customers 104 and other people. The electronic marketplace 114 may maintain user account data 118, which may store user transaction data, past purchases, user profile data, and other related information.

In some embodiments, an image-based review engine 120, executed by the service provider 102, may perform some image analysis, which may determine and/or verify items depicted in images using machine vision techniques, crowdsourcing techniques, or both. The image-based review engine 120 may add textual information (e.g., tags, etc.), possibly as metadata for association with individual images. The textual information may be determined based on text information associated with a source of the image (e.g., a text review of an item, content of a message post, etc.), an analysis of the image (e.g., via machine vision and/or human input/selection such as user input along with submission of an image), and/or other known techniques. In some embodiments, the image-based review engine 120 may determine an age or number of uses of a product included in an image. The determination may be based on the textual information, metadata, and/or other information accessible to the image-based review engine 120 as discussed below.

In some embodiments, the image-based review engine 120 may also obtain images from other entities 122, such as a social network entity 122(1), an image message provider entity 122(2), a blog provider entity 122(N), and/or other entities that may include images of products and possibly some textual information associated with the images that provides information about the subjects (e.g., products) in the images.

As an example, a customer of the customers 104 may send the service provider 102 a product review 124, which may include an image 126 and text 128 describing the product. The image-based review engine 120 may analyze the text 128 to create tags (words, phrases, keywords, numbers, dates, and/or other textual information) that represent information in the text 128. For example, the text 128 may state that the item is a week old, while a tag may be created that indicates the age as 7 days. Thus, the tags may capture consolidated meanings from the more extensive text 128. The image-based review engine 120 may perform an image analysis of the image to determine additional tags and/or may request human input to provide more tags. The tags may be associated with the image 126, possibly via metadata. In some embodiments, the image-based review engine 120 may modify the image, such as by adding a marker to identify a location of the product in the image or a visual feature of the item, cropping the image, and/or making other modifications discussed below. The image may then be saved in the storage device 112 for later use.

In accordance with one or more embodiments, the image-based review engine 120 may create an image-based review 130 that may be provided to a user device 132, associated with a user 134 (e.g., prospective customer), via a user interface 136. The image-based review 130 may be formed by organizing the various images that are stored in the storage device 112. For example, the user 134 may desire to see an image-based review of a first item X that shows information about how the item holds up to wear over time. The image-based review engine 120 may create a timeline view of the item X that shows used items based on their item age so that the user 134 can discover any known problems related to wear and durability. For example, when the item is a pair of shoes, the timeline view may show images of worn shoes, which may uncover frequent problems, such as holes in the shoes, worn out soles, damaged soles, discoloration, and/or other problems. The image-based review engine 120 may create many different types of image-based reviews, which may be used for comparison shopping, to provide recommendations to users, for information reasons, and/or for other reasons.

In some embodiments, the service provider 102 may generate this information for the electronic marketplace 114, which may host the image-based review information or may make such information available to users from the service provider 102. The image-based reviews may contain little or no text, allowing users to quickly extract information from the image-based reviews without having to read much or any text. Examples of some illustrative user interfaces are shown in FIGS. 7A-12 and described below. The image-based review engine 120 and illustrative hardware configurations of the service provider 102 is described next.

Figure 2:
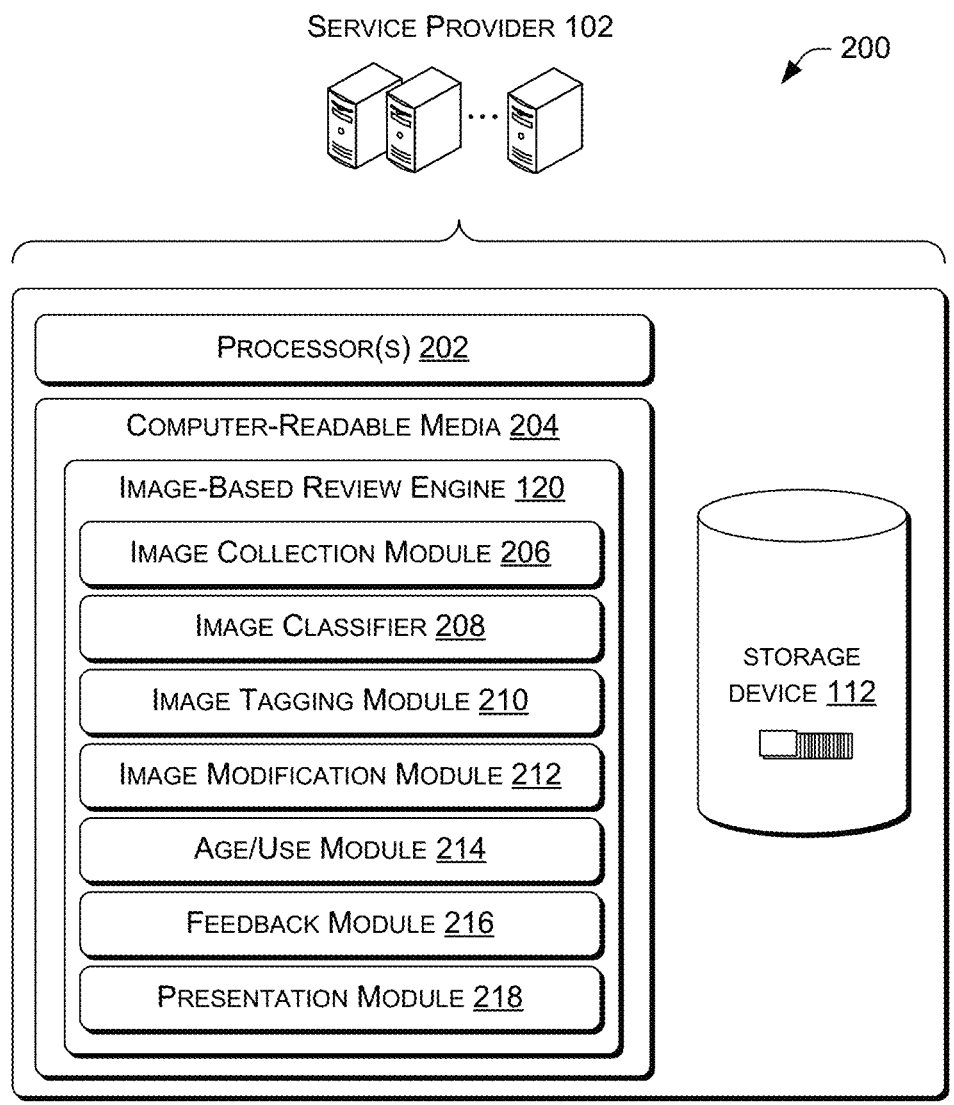
FIG. 2 is a schematic diagram of an illustrative computing architecture of a service provider that generates image-based item reviews.

FIG. 2 is a schematic diagram of an illustrative computing architecture 200 of a service provider that generates image-based item reviews. The computing architecture 200 may be implemented in a distributed or non-distributed computing environment.

The computing architecture 200 may include one or more processors 202 and one or more computer readable media 204 that stores various modules, applications, programs, or other data. The computer-readable media 204 may include instructions that, when executed by the one or more processors 202, cause the processors to perform the operations described herein for the service 104.

Embodiments may be provided as a computer program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of media/machine-readable medium suitable for storing electronic instructions. Further, embodiments may also be provided as a computer program product including a transitory machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks.

In some embodiments, the computer-readable media 204 may store an image collection module 206, an image classifier 208, an image tagging module 210, an image modification module 212, an age/use module 214, a feedback module 216, and a presentation module 218, which are described in turn. The various modules may include read and/or write permissions regarding images and/or other data stored on the storage device 112. The modules may be stored together or in a distributed arrangement.

The image collection module 206 may receive images from various sources, such as from customers that submits images along with customer reviews of products. The images may depict use of the items or used items. In some embodiments, the image collection module 206 may obtain images from the entities 122, such as by accessing data posted by the entities that is allowed to be used by the service provider 102 (e.g., in compliance with user authorization, licenses, and/or other permissions or factors). The image collection module 206 may also gather text and/or other information associated with the images that may be utilized by the image tagging module 210. In some embodiments, the image collection module 206 may provide prompts to users, such as to request that a user upload an image with an item review to visually depict the item. The prompt may be based on text in the review, such as text that denotes a particular problem, wear of the product, condition of the product, and so forth. In various embodiments, the image collection module 206 may request input from the user regarding content or features shown in the image, such as to ask the user to verify or add textual descriptions that may be useful to create tags for the images.

The image classifier 208 may be used to determine textual information based on an analysis of the image using machine vision algorithms, crowd sourcing, and/or other user or machine input. For example, the image classifier 208 may be used to locate a known product in the image, such as by searching the image for unique features of the known product (e.g., color, unique shapes, etc.) using a trained classifier. Using the location information, a marker may be added (e.g., an arrow, a circle, a rectangle, or other identifier) to help a user locate the item, crop the image to remove extraneous imagery, and/or for other reasons. The image classifier 208 may determine information about attributes about the product, which may be used to determine a condition of the product, an age of the product, a number of uses of the product, and so forth. For example, the image classifier 208 may detect discoloration in a product, detect a tear or other visual feature that is not normally associated with the product, and/or detect other attributes in the image. In various embodiments, the image classifier 208 may rely on at least some human input to extract information about the product in the image. In some embodiments, the image classifier 208 may request users (such as other prospective customers) to contribute textual information about contents in the image. The textual information may then be used to determine whether the image is appropriate to post, used for adding tags to the image, and/or used for other purposes. In some embodiments, the image classifier 208 may request input from the user that submits the image, possibly at or near the time of submission of the image. The image classifier 208 may request a user to identify the product in the image, such as by asking the user to provide input regarding the location of the product in the image, which can be detected by the image classifier 208. The image classifier 208 may generate additional textual information that can be associated, at least temporarily with an image.

The image tagging module 210 may use the textual information from the image collection module 206 and/or from the image classifier 208 to generate tags to associate with the images. The tags may be stored as metadata of the images or otherwise associated with the images in the storage device 112. The tags may be used to organize the images, categorize the images and/or items, select images, generate other information about the images (e.g., the age of the product in the image, the number of uses of the product, etc.), provide information to users (when the tags are made visible to users in an output) and/or for other reasons.

The image modification module 212 may modify images based at least partly on information obtained by the image classifier 208. The image modification module 212 may modify an image to add a marker (e.g., an arrow, a circle, a rectangle, or other identifier) to identify a location of the product in the image or the location of a feature of the item (e.g. a worn part, etc.). In some embodiments, the image modification module 212 may crop the image to remove extraneous imagery. The image modification module 212 may add text to an image so that the text becomes part of the image. In some embodiments, the image modification module 212 may add, modify, or remove metadata associated with the image, such as based on information from the image tagging module 210, the age/use module 214, and/or from other modules discussed herein.

The age/use module 214 may determine an age and/or a number of uses associated with a product in the image. For example, the product that may be of a pair of used boots owned by a person that provides a review of the boots. The review may state information about how long the user has owned the boots (i.e., the age), may indicate how frequent the shoes where used (e.g., daily, occasionally, a few times, etc.), and/or may indicate a total number of uses of the product (e.g., used once, used a dozen times, etc.). However, this information may not always be available. In some embodiments, the age may be calculated based on a date that the user purchased the item and the data of the posting of the image, which may create an estimated age of the item. The age and/or the number of uses may be inferred from other information associated with the image and/or the user that posted the image. For example, if the image is a pair of skis and the user that posted the picture also purchased eight lift tickets from the electronic marketplace 114 since purchasing the skis, the age/use module 214 may determine, via an inference, that the skis were used eight times. In some embodiments, the age/use module 214 may determine the age and/or number of uses of the item based on information from the image classifier 208, such as based on an appearance of the item. The age and/or number of uses may be expressed in numerical formats and/or using groupings, such as new, relatively new, older, heavy used, barely used, etc. In some embodiments, the age/use module 214 may normalize an age of an item using a given age of the item and a frequency of use. For example if the average person expects the age to represent daily wear, and a user posts that she has owned the shows for a year, but only wears them a couple of times a week, then the normalized age may be about a third of a year (e.g., 2 times×52 weeks=104 days~a third of 365 days). In some embodiments, and in a similar manner, the age/use module 214 may determine the other metrics that may be helpful in determining an amount of use, such as distance (e.g., for a car or bike), time (for diving gear), and so forth.

The feedback module 216 may enable users to provide feedback on images, such as images used to create the image-based reviews. In some embodiments, the feedback module 216 may capture basic information such as whether the image was helpful or not helpful (e.g., thumbs up, thumbs down, etc.). The feedback module 216 may capture reports of improper images. In some embodiments, the feedback module 216 may capture additional information that can be used to add tags to the image.

The presentation module 218 may organize the images and generate an image-based review for a user interface presented to one or more users. The image-based review may provide images arranged based on an estimated age or number of uses of the product in the images, which may enable a user to see if the product is durable (e.g., how the product holds up over time). The image-based reviews may include a comparison presentation that shows a selected representative image for a particular category, such as for areas of wear (e.g., worn hear, discoloration, separated adhesive, etc.), user sentiment, user rating, and so forth. In some embodiments, the user-based reviews may include a presentation of many images with little or no text, and sorted by one or more criteria, such as by user sentiment (e.g. positive/negative), by a rating (e.g., number of starts), by age or uses, and/or by other factors. FIGS. 7A-12 show some illustrative user interfaces that feature information provided by the presentation module 218; however, these presentations are not exhaustive of all outputs that may be produced by the presentation module 218.

FIGS. 3-6 show a flow diagram of illustrative processes illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

Figure 3:
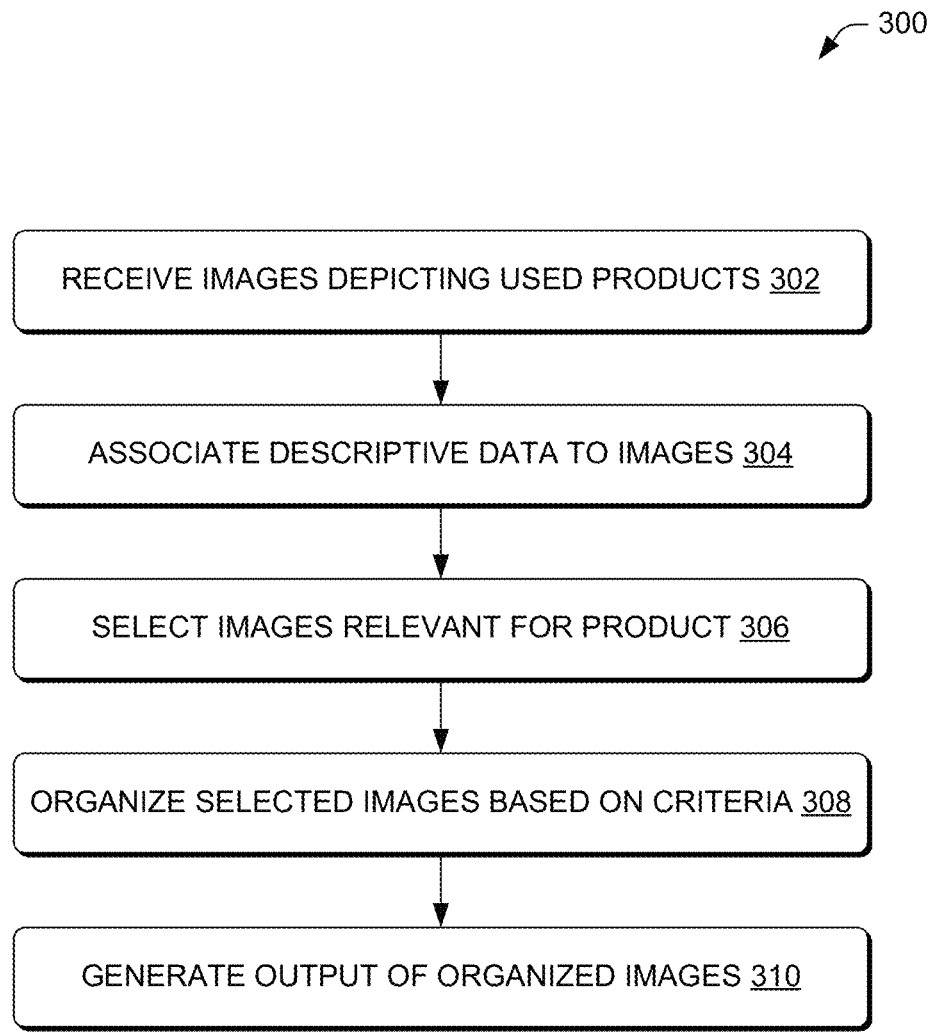
FIG. 3 is a flow diagram of an illustrative process to generate image-based item reviews.

FIG. 3 is a flow diagram of an illustrative process 300 to generate image-based item reviews. The process 300 is described with reference to the environment 100 and may be performed by the image-based review engine 120 of the service provider 102.

At 302, the image collection module 206 may receive images depicting used products. The images may be uploaded to the image collection module 206 by customers, such as customer that write product reviews. In some embodiments, the images may be obtained from other sources, such as social media sites, blog posts, message or discussion boards, photograph posting sites, and/or other sources that include images. The image collection module 206 may obtain permission to use the images in image-based reviews, such as from an owner of the images, a sender of the image, a copyrights holder, and/or other interested parties. The images may be associated with text, such as a text-based product review, text from a message or post, metadata, a title, and/or other information. The images may include images that feature a product, images that feature users that use the product (e.g., users that use hair or skin products, for example), and/or images featuring the product in an environment (e.g., a pair of skis on a snowy mountain, where the skis are hardly visible). However, other types of images may be used.

At 304, the image tagging module 210 may associate descriptive data to the images, such as by adding tags, which may be stored as metadata. The tags may consolidate useful information from a user review, such as quality of an item, sentiment, rating, age, number of uses, type of use (e.g., heavy, average, light, etc.) specific problems, positive information, favorite features, and/or other information. Some of the descriptive data may be provided by the user during or after an upload of an image. In some embodiments, some of the descriptive data may be obtained via machine and/or human inspection of the image.

At 306, the presentation module 218 may select images that are relevant for the product. For example, some images may not even show the product or have any logical relationship with the product. However, some images that do not show the product may be helpful, such as an image that was taken by the product (when the product is a camera or has a camera) may be useful or an image of a person using the product may be useful even if it's hard to see the product (e.g., a pair of skis in snow, etc.). Images deemed to have little or no value and/or deemed inappropriate may be disregarded and possibly removed from the storage data 112. In addition, text that is not relevant may be disregarded. For example, text that includes sentiment that the item allegedly makes a user look unflattering may not be associated with a quality of the item, and may thus be disregarded in some embodiments.

At 308, the presentation module 218 may organize selected images based on a criteria. Examples of criteria are categories, age of the product, number of uses, user rating, user sentiment (e.g., of quality of item, etc.), and/or other criteria. Categories may include conditions (e.g., types of problems with the product), types of images (e.g., product focus, product used in the environment, user enjoying product, etc.), user rating, sentiment, item age, item usage, and/or other groupings of the images based on the descriptive data.

At 310, the presentation module 218 may generate an output of the organized images. The output may include a collage of images, a sorted display of images, a timeline or number of uses-view, use of graphical instruments or charts to show the images, and/or include other arrangement of the images to create an image-based review. The presentation module 218 may provide a user interface that enables the user to explore the images and drill down to further information, such as the textual review associated with an image, possibly in response to a selection of an image. The images may be presented with little or no text to enable a user to quickly view information on the user interfaces with little distractions or reading of text.

Figure 4:
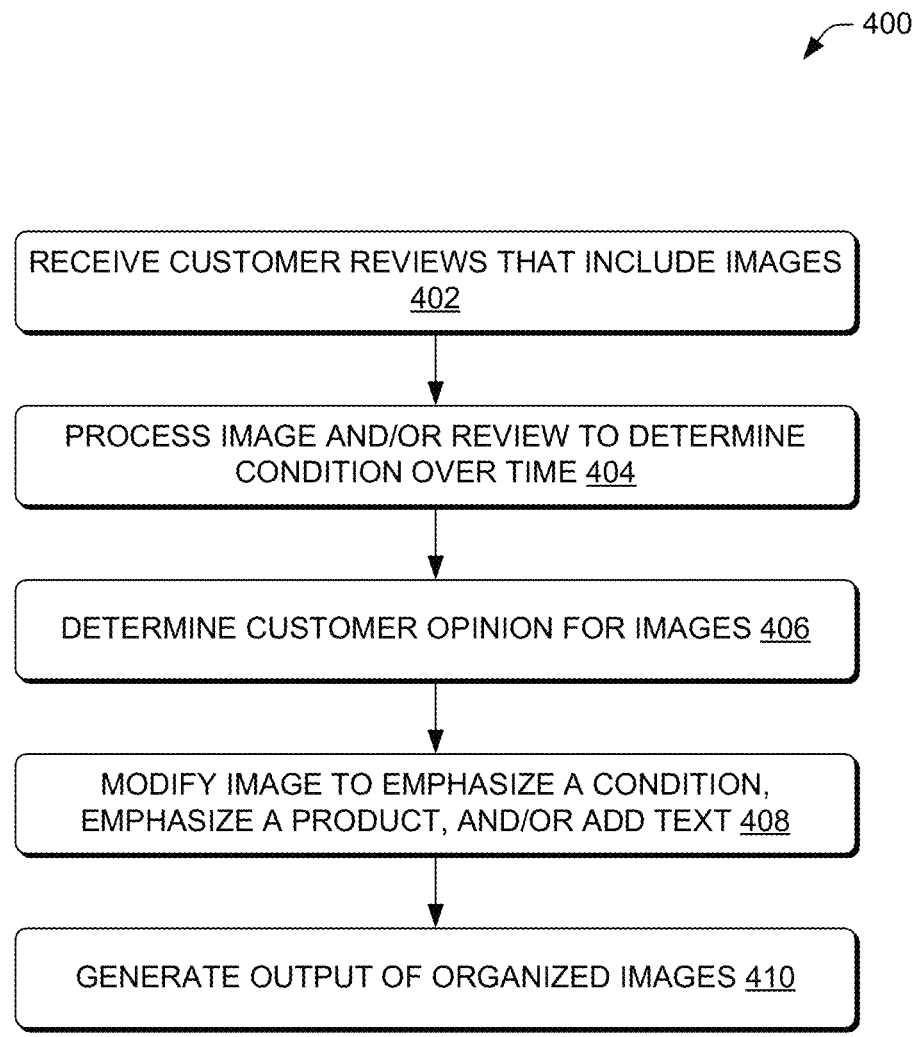
FIG. 4 is a flow diagram of an illustrative process to modify and organize images to generate image-based item reviews.

FIG. 4 is a flow diagram of an illustrative process 400 to modify and organize images to generate image-based item reviews. The process 400 is described with reference to the environment 100 and may be performed by the image-based review engine 120 of the service provider 102.

At 402, the image collection module 206 may receive customer review that include images. The images may depict an item used by the user that is a subject of the review. The image collection module 206 may also obtain or access associated text, such as the review, along with the image. The process 402 may be similar to the process 302 described above.

At 404, the image classifier 208 and/or the item tagging module 210 may process the image, process the review, or both to determine a condition of the product over time. For example, the review may indicate a condition of the item (e.g., works great, broken part, has a hole in it, etc.). Inspection of the image may provide similar types of information. The item tagging module 210 may identify different conditions of the item based on an analysis of the tags. As discussed above, temporal or use information may be determined by the age/use module 214 and may be associated with the item in the image.

At 406, the image tagging module may determine customer opinion associated with images. The customer opinion may be a user rating (e.g., number of stars, good/bad, etc.), a user sentiment regarding quality (possibly using analysis of the words used in a message/review), and/or other opinion information. The customer opinion information may be associated with respective images, possibly using the image tagging module 210.

At 408, the image modification module 212 may modify an image to emphasize a condition, emphasize the product, and/or add text. For example, the image modification module 212 may modify an image by adding a marker (e.g., an arrow, a circle, a rectangle, or other identifier) to identify the item, crop the image to remove extraneous imagery, and/or for other reasons. The image modification module 212 may add text to the image as metadata or imagery viewable on the image.

At 410, the presentation module 218 may generate output of organized images using the modified images to create an image-based review. The image-based review may be organized based on the customer opinion, the condition, the age, and/or based on other factors. The image-based review may include little or no text. In some embodiments, selection of an image in the image-based review may cause presentation of additional information associated with the selected information, such as a textual review that included the image.

Figure 5:
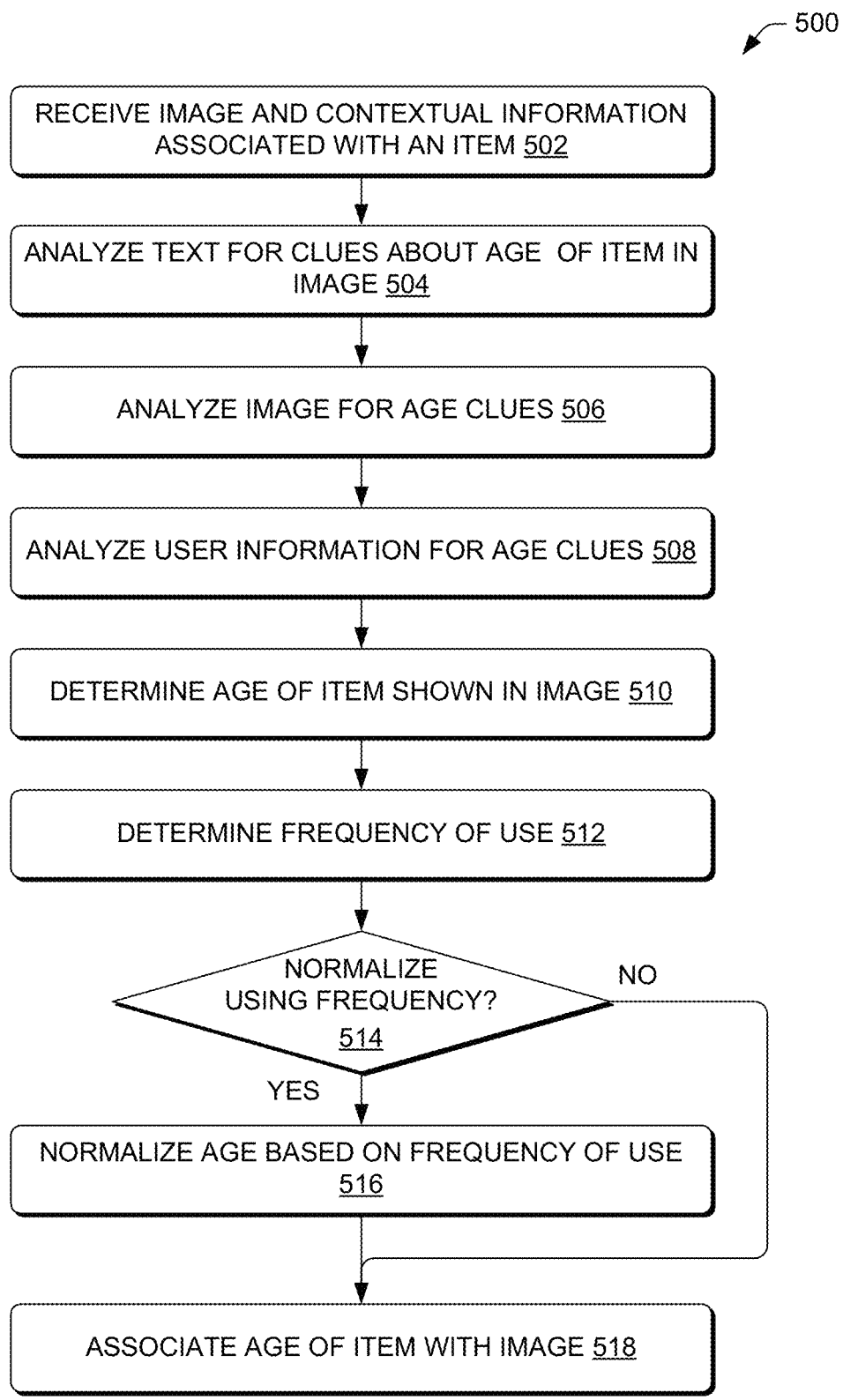
FIG. 5 is a flow diagram of an illustrative process to associate an item age with an item depicted in an image.

FIG. 5 is a flow diagram of an illustrative process 500 to associate an age with an item depicted in an image. The process 500 is described with reference to the environment 100 and may be performed by the image-based review engine 120 of the service provider 102.

At 502, the image collection module 206 may receive an image and contextual information associated with the item, such as a review of a product, a blog post, or a message. The image may include the product as a subject in the image. However, in some instances, the subject may be a user of the product (e.g., person using cosmetics, etc.) or the product in an environment. The operation 502 may be similar to the operation 302 described above.

At 504, the image tagging module 210 may analyze the text for clues about the age of the item in the image. For example, a review may indicate that the user has had a pair of skis for a week or had just bought them. These clues indicate that the skis are new, likely used few times if at all, and possibly about a week old. In some embodiments, the text may provide information which may be used to infer an age of the item, such as text that states "got them for Christmas" or "received them for my birthday". Since both of these days are presumably known, then the age/use module 214 may be able to determine the age of the item. In some instances, the image-based review engine 120 may request the user uploading the image to input the item age depicted in the image. The image tagging module 210 may further determine a type of use, such as a heavy use (e.g., used the boots to climb mountains, etc.), an average use (e.g., used the boots for work, etc.), and a light use (e.g., used the boots for short city walks, etc.). Of course, other groupings or rankings may be used to describe a "type of use." This type of use information may be used to categorize or adjust an age of the boots accordingly.

At 506, the image classifier 208 may analyze the image for clues about the age of the item. For example, the image is likely associated with an upload date, which may be stored in metadata as a date of creation or modification. The image may include a date or other information that may be used to infer an age of the item. The image may show the user unwrapping the skis and wearing a birthday hat, for example. The image may also show other information that indicates an age or can be used to determine an age of the item.

At 508, the age/use module 214 may access information from the electronic marketplace 114, such as the user account data 118, which may indicate a date that the item was purchased from the electronic marketplace, received from a shipment, or otherwise obtained by the customer. This may be used with a date associated with the upload of the image to determine an age of the item.

At 510, the age/use module 214 may determine an age of the item shown in the image based on at least some of the information obtained by any one of the operations 504, 506, and/or 508. The age of the item may be expressed as a numeric value, such as a number of days, number of weeks, number of years, etc., or may be expressed with more general groupings, such as new, fairly new, well used, old, and so forth.

At 512, the age/use module 214 may determine a frequency of use associated with the item. The frequency may be determined using similar techniques as described above for the operations 504, 506, and/or 508. For example, the frequency of use may be provided in a review, such as a statement that indicates "worn ever day", "work weekly," "used a few times a month", and so forth. In some instances, frequency of use may not be available.

At 514, the age/use module 214 may determine whether to normalize the age of the item determined at the operation 510. The normalization may be performed by comparing the frequency of use to a standardized frequency of use for the item, and then adjusting the age based on the comparison. For example, the frequency of use could be divided by the standardized frequency to create a multiplier, which may then be multiplied by the determined age to create a normalized age that may better reflect an age of the item if the item were used at the standardized frequency of use. The standardized frequency may be determined by obtaining a mean or average value of the frequency of use across multiple users. In some embodiments, the normalization may include the type of use (e.g., heavy, average, light, etc.), as described above. When the frequency information is available and the age/use module 214 determines to normalize the age using the frequency (following the "yes" route from the decision operation 514), then the process 500 may advance to an operation 516 and may generate a normalized age based on the frequency of use.

Following the operation 516, or when the frequency information is not available or the age/use module 214 determines not to normalize the age using the frequency (following the "no" route from the decision operation 514), then the process 500 may advance to an operation 518. At 518, the age/use module 214 may associate the age of the item with the image, such as by creating a tag, using the image tagging module 210, to associate the age of the item with the image.

Figure 6:
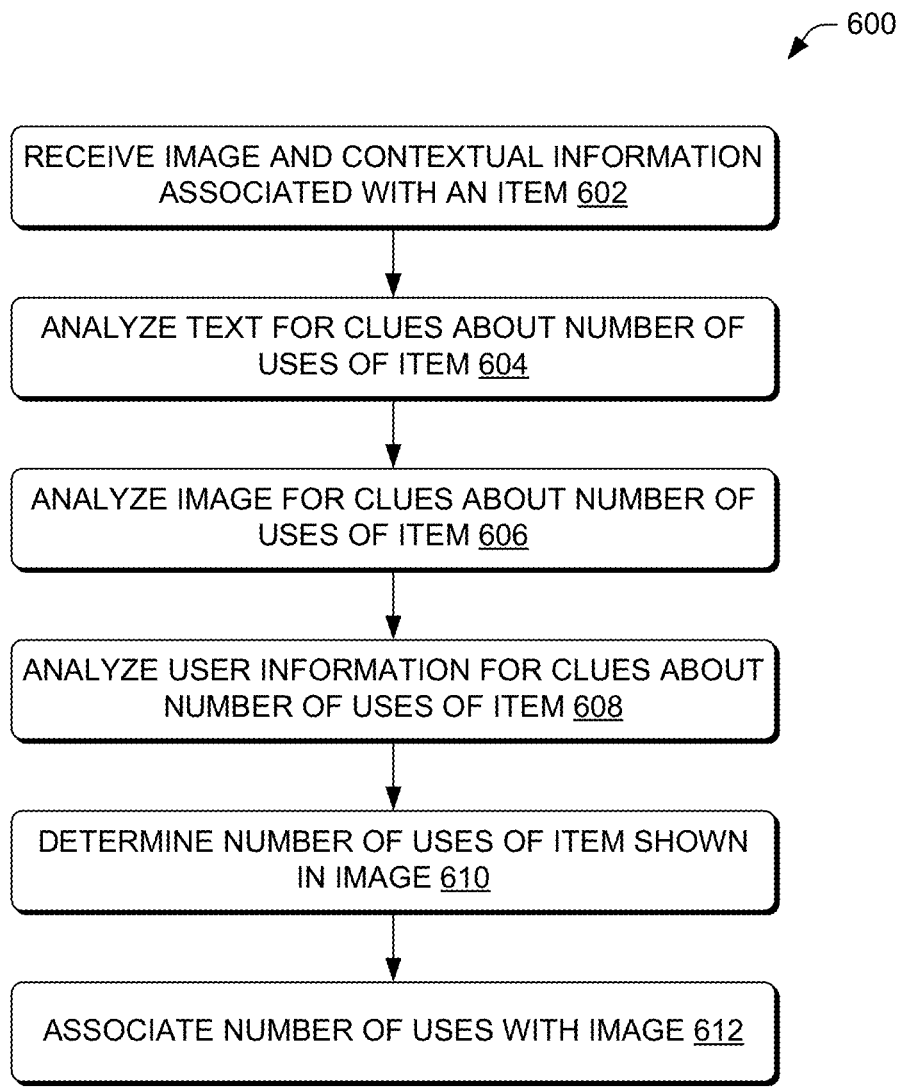
FIG. 6 is a flow diagram of an illustrative process to associate a number of uses with an item depicted in an image.

FIG. 6 is a flow diagram of an illustrative process 600 to associate a number of uses with an item depicted in an image. The process 600 is described with reference to the environment 100 and may be performed by the image-based review engine 120 of the service provider 102.

At 602, the image collection module 206 may receive an image and contextual information associated with the item, such as a review of a product, a blog post, or a message. The image may include the product as a subject in the image. However, in some instances, the subject may be a user of the product or the product in an environment. The operation 602 may be similar to the operation 302 described above.

At 604, the image tagging module 210 may analyze the text for clues about the number of uses of the item in the image. For example, a review may indicate that the user has used the skis a few times or just took the item out of the box (indicating it has not been used yet. These clues indicate that the skis are new, likely used three times (for the skis) or not used at all (for the unboxed item). In some embodiments, the text may provide information which may be used to infer a number of uses of the item, such as text stating "bought them to use on our week-long ski trip". The age/use module 214 may infer that the skis were used five times (for five days, assuming some travel and/or rest days). In some instances, the image-based review engine 120 may request the user uploading the image to input the number of uses of the item depicted in the image. The image tagging module 210 may further determine a type of use, such as a heavy use (e.g., used the boots to climb mountains, etc.), an average use (e.g., used the boots for work, etc.), and a light use (e.g., used the boots for short city walks, etc.). Of course, other groupings or rankings may be used to describe a "type of use." This type of use information may be used to categorize the number of uses of the boots accordingly.

At 606, the image classifier 208 may analyze the image for clues about the number of uses of the item. For example, the image may show the user holding three ski passes which may indicate that the new skis were used three times. The image may also show other information that indicates a number of uses or can be used to determine a number of uses of the item.

At 608, the age/use module 214 may access information from the electronic marketplace 114, such as the user account data 118, which may indicate a number of uses. For example, when the user account indicate that the user purchased ski passes for five days just after the purchased the skis, then this information may be used to determine that the skis were used 5 times.

At 610, the age/use module 214 may determine a number of uses of the item shown in the image based on at least some of the information obtained by any one of the operations 604, 606, and/or 608. The number of uses of the item may be expressed as a numeric value or may be expressed with more general groupings, such as not used, used a few times, just a lot, put it through the wringer, etc.

At 612, the age/use module 214 may associate the number of uses of the item with the image, such as by creating a tag, using the image tagging module 210, to associate the number of uses of the item with the image.

FIGS. 7A-12 show illustrative user interfaces that may enable a user to quickly extract useful information about an item from the images. Some aspects of two more of the UIs may be combined into a single UI. The UIs may be presented in many different ways, and thus are not limited to the specific presentation shown in the illustrative UIs. For example, items organized in pie charts could alternatively be displayed with relation to bar graphs or other groupings, which may or may not include text or numbers.

FIG. 7A shows an illustrative UI 700 that includes images arranged in association with a timeline 702. The range of the timeline 702 may be based on the item age range of the selected category of images in the storage device 112. Representations of images 704 may be arranged along the timeline 702 to represent items in images having the respective ages. For example, if an item in an image is aged at one year old, then the representation of the image would be located near the one year mark along the timeline 702. The representations 704 may show thumbnails or smaller versions of the images.

During user interaction with the UI 700, the user may select one of the representations 704, such as a selected representation 706. The UI 700 may then reveal the associated image 708 and possibly additional information 710 about the image, such as the normalized age, the true age, and/or any tags associated with the image. In some embodiments, the image or other data may provide a selectable link to enable a user to access an associated review, message post, a user rating, a sentiment, and/or other information. In some embodiments, the UI 700 may enable a user to select a relative type of use 712, such as selections indicating "heavy use", "average use", and "light use" or other selectors of other types of use. For example, use of the boots to climb mountains may be categorized or tagged as "heavy use". Those pictures may be shown upon selection of a "heavy use" selector. A normalization control 714 may enable display of the UI 700 using a normalized age, as described in the process 500.

FIG. 7B shows an illustrative UI 716 that includes images arranged in association with a use-chart 718. The range of the use-chart 718 may be based on the range of the number of uses of item having images in the storage device 112. Representations of images 720 may be arranged along the use-chart 718 to represent items in images having the respective number of uses. The representations 720 may show thumbnails or smaller versions of the images.

During user interaction with the UI 716, the user may select one of the representations 720, such as a selected representation 722. The UI 716 may then reveal the associated image 724 and possibly additional information 726 about the image, such as the estimated number of uses, and/or any tags associated with the image. In some embodiments, the image or other data may provide a selectable link to enable a user to access an associated review, message post, a user rating, a sentiment, and/or other information.

FIGS. 8A-8C show illustrative UIs that includes images arranged by different categories and enable users to explore the images in each category. FIG. 8A shows an illustrative UI 800 including images arranged by condition of an item. The UI 800 may include a chart 802, such as a pie chart, a line chart, or other type of representation that provides additional information to a user, such as a quantity, a percent, or other information. In the illustrative UI 800, the chart 802 shows a pie chart that presents different conditions 804 associated with an item (a shoe in this example). Example conditions may include "heal", indicating a problem with the heal, "sole", indicating a problem with the sole, "lace", indicating a problem with the laces, and "color", indicating a problem with the color of the item. Other conditions may be used. Representations of images 804 may be placed in corresponding conditions of the conditions 804 represented in the chart 802. In some embodiments, a percentage associated with the chart (or a quantity associated with the chart, etc.) may be based on information using the corresponding number of images. However, a percentage associated with the chart (or a quantity associated with the chart, etc.) may be based on information other than the corresponding number of images since the number of images may not accurately reflect a frequency of the condition. For example, if forty percent of the users mention the condition of the sole separating form the upper of the shoe, but only twenty percent of the images are tagged with this designation, the pie chart may provide a slice indicating forty percent and may place the twenty image representations within that slice (or near that slice) for selection by a user. In some instances, the UI 800 may enable section of the slice to drill down on further details about a condition, such as sub conditions presented in a second, related UI.

During user interaction with the UI 800, the user may select one of the representations 806, such as a selected representation 808. The UI 800 may then reveal the associated image 810 and possibly additional information about the image, such as one or more of the tags associated with the image. In some embodiments, the image or other data may provide a selectable link to enable a user to access an associated review, message post, a user rating, a sentiment, and/or other information.

FIG. 8B shows an illustrative UI 812 including images arranged by a rating or sentiment associated with the item. The UI 812 may include a chart 814, such as a pie chart, a line chart, or other type of representation that provides additional information to a user, such as a quantity, a percent, or other information. In the illustrative UI 812, the chart 814 shows a pie chart that presents different user ratings 816 associated with an item (a shoe in this example). User ratings may include star ratings of one to five stars. However, other user ratings or sentiment values may be used. Representations of images 816 may be placed in corresponding ones of the user ratings 816 represented in the chart 814. During user interaction with the UI 812, the user may select one of the representations 818, such as a selected representation 820. The UI 812 may then reveal the associated image 822 and possibly additional information about the image, such as one or more of the tags associated with the image. In some embodiments, the image or other data may provide a selectable link to enable a user to access an associated review, message post, a product condition, and/or other information.

FIG. 8C shows an illustrative UI 824 including images arranged by a subject of the image. The UI 824 may include a chart 826, such as a pie chart, a line chart, or other type of representation that provides additional information to a user, such as a quantity, a percent, or other information. In the illustrative UI 824, the chart 826 shows a pie chart that presents different image subjects 828 associated with an item (a shoe in this example). Example image subjects 828 may include product, customer, and environment. Representations of images 828 may be placed in corresponding ones of the image subjects 828 represented in the chart 826. During user interaction with the UI 824, the user may select one of the representations 830, such as a selected representation 832. The UI 824 may then reveal the associated image 834 and possibly additional information about the image, such as one or more of the tags associated with the image. In some embodiments, the image or other data may provide a selectable link to enable a user to access an associated review, message post, a user rating, a sentiment, and/or other information.

Figure 9:
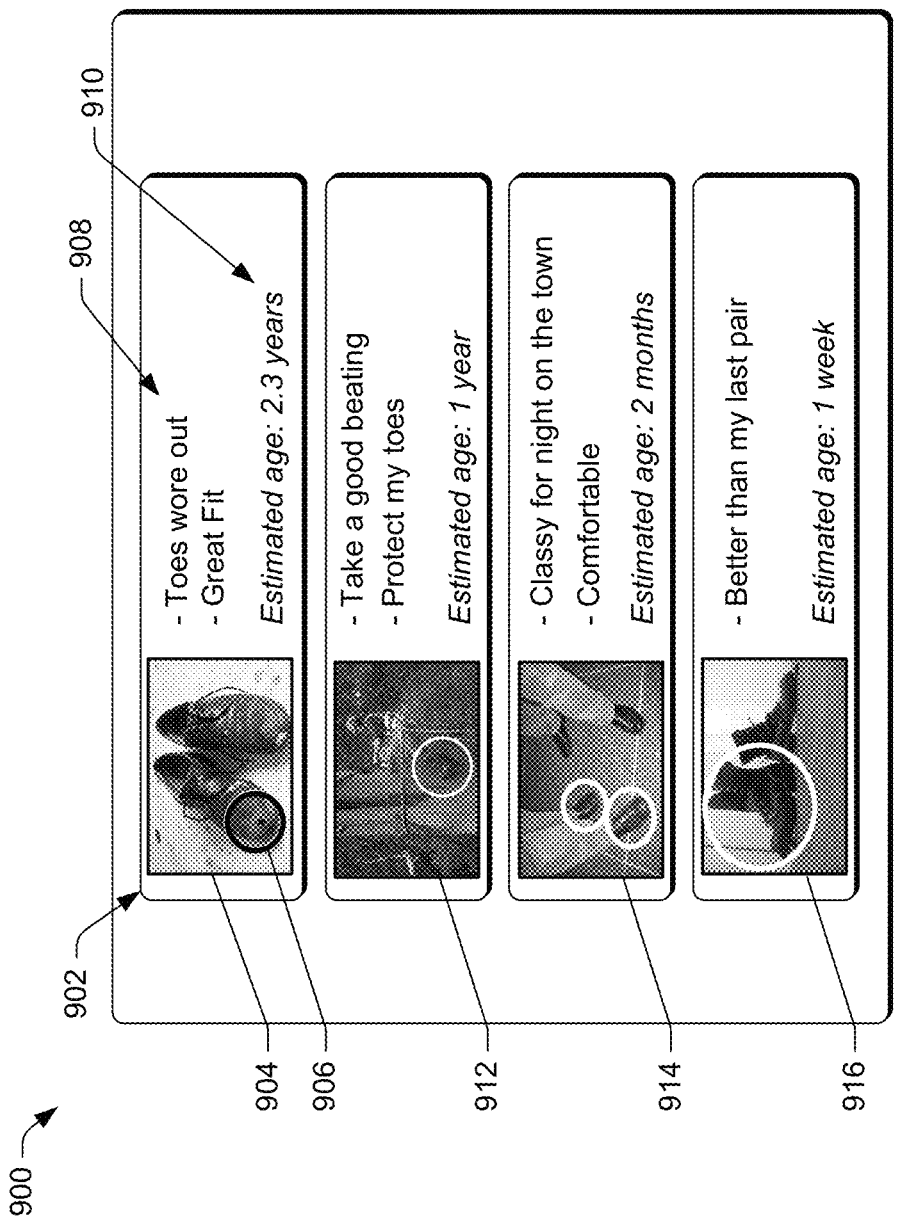
FIG. 9 shows an illustrative UI that includes modified images that may be tagged or associated with some textual information.

FIG. 9 shows an illustrative UI 900 that includes modified images that may be tagged or associated with some textual information. The UI 900 may include image tiles 902. Each image tile may include an image 904. The image 904 may be modified to mark a feature in the image, which may be the item (e.g., a shoe, etc.) or a portion of the item (e.g., a flaw or wear, etc.). The image tile may also include tags associated with the image. The image tile may include an item age associated with the item included in the image (or a number of uses). The image tiles 902 may be sorted by specified criteria, such as an item age of the item in the images. As shown in the UI 900, the image tiles 902 are sorted in reverse chronological order to show images of shoes with some tags. This sorting may enable a user to quickly determine information about the shoes using an image-based review that is sorted by item age. The user may focus on the images to obtain a better understanding of the durability and user satisfaction associated with the item. For example, the images 912, 914, and 916 depict images associated with neutral or positive sentiment, which may reflect a quality of the item, as compared with superficial sentiment ratings, which may be ignored or disregarded. The image tiles 902 and or images may be selectable to provide the user with additional information, such as a review associated with the image and/or other information.

Figure 10:
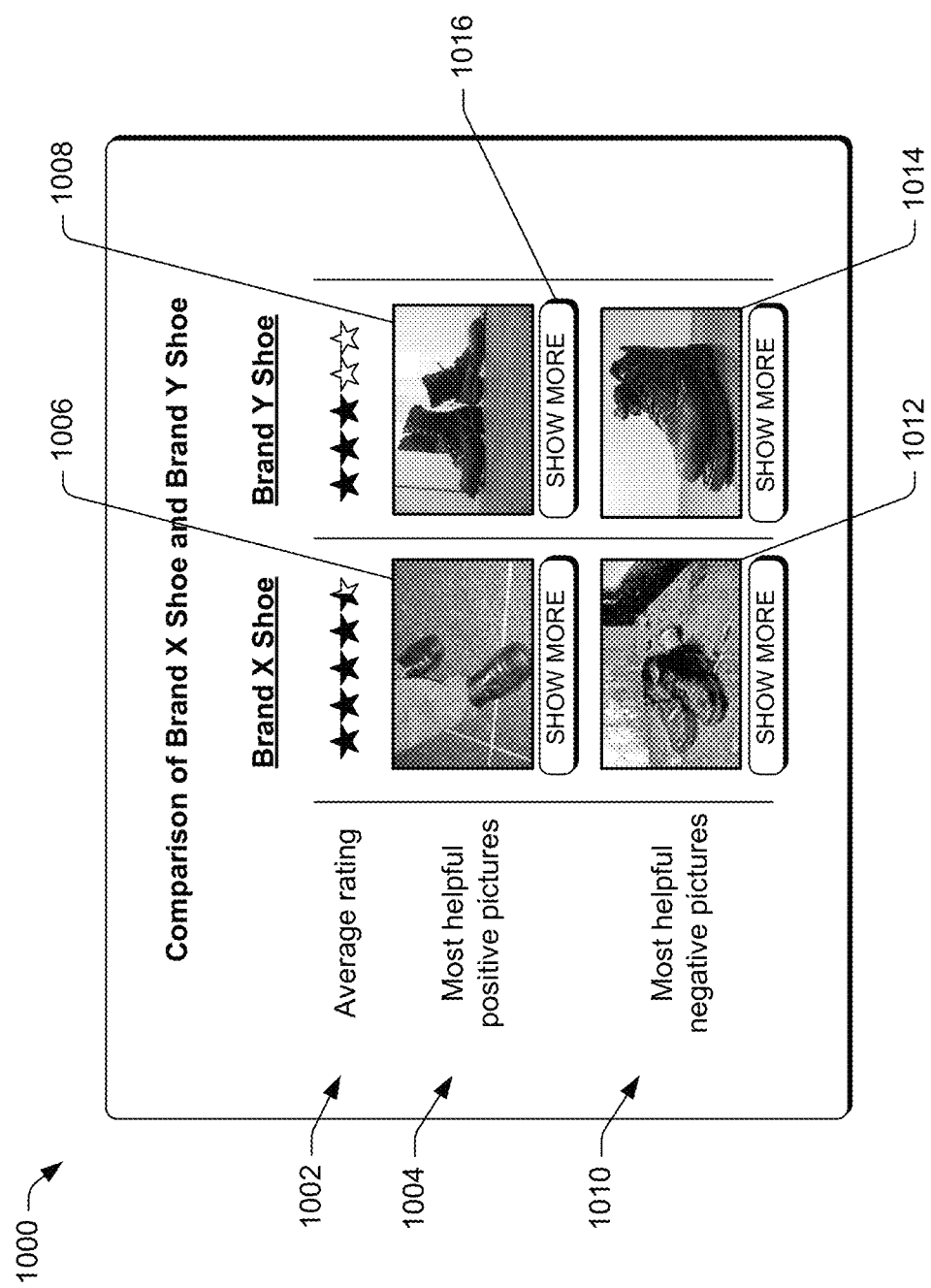
FIG. 10 shows an illustrative UI that depicts a comparison of items and includes selected images of the items.

FIG. 10 shows an illustrative UI 1000 that depicts a comparison of items and includes selected images of the items. The UI 1000 may include different categories of information 1002 used to compare different items. The UI 1000 may leverage images to provide review information about items. In some embodiments, images may be ranked by customers as "helpful" or "not helpful" (or using similar opposing ratings such as positive/negative or thumbs up/down, etc.). A "most helpful positive image" category 1004 may show a best or representative first positive image 1006 for a first item and show a best or representative second positive image 1008 for a second item. A "most helpful negative image" category 1010 may show a best or representative first negative image 1012 for the first item and show a best or representative second negative image 1014 for the second item. The images may be selectable to determine more information about that image and/or to see other similar images. In some embodiments, a "show more" control 1016 may be associated with some images to enable access to similar images and/or additional images.

Figure 11:
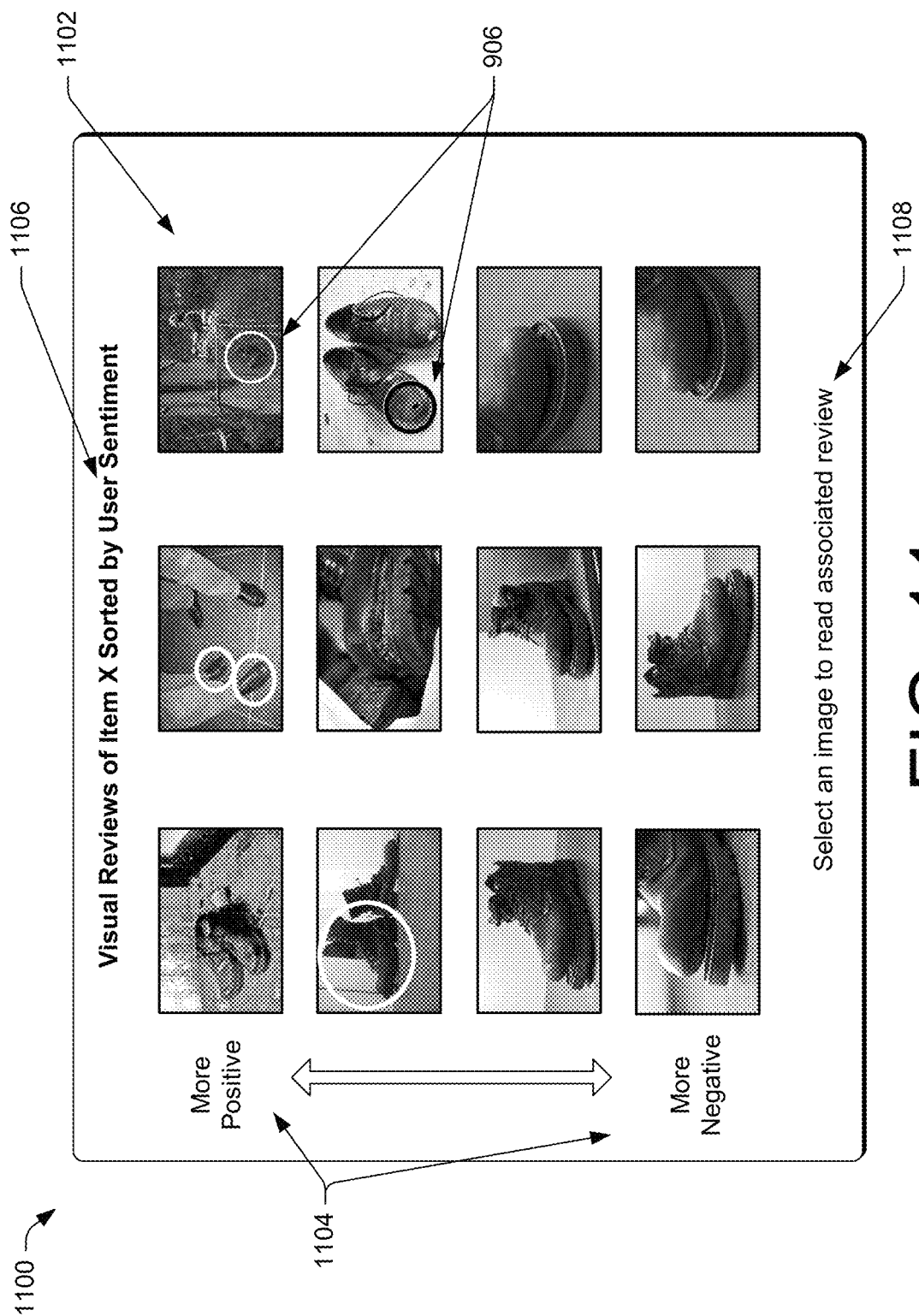
FIG. 11 shows an illustrative UI that includes images of items organized by a category to provide an item-based review.

FIG. 11 shows an illustrative UI 1100 that includes images of items organized by a category to provide an item-based review. The UI 1100 may include images 1102 that are sorted by one or more criteria 1104, such as a user rating, a user sentiment, and/or other criteria (e.g., age, uses, condition, etc.). As shown in FIG. 11, at least some of the images 1102 may include the markers to indicate the product in the image and/or to indicate a condition or other information of the product. The UI 1100 may use minimal or no text, which may enable a user to quickly process the visual information in the UI. The images 1102 may be selectable to enable a user to determine more information about that image (e.g., a user sentiment, a user rating, tags, etc.), to see text associated with the image (e.g., a review, a message post, etc.) and/or to see other similar images. The UI 1100 may include a title 1106 and/or brief instructions 1108 to guide users during interaction with the UI 1100.

Figure 12:
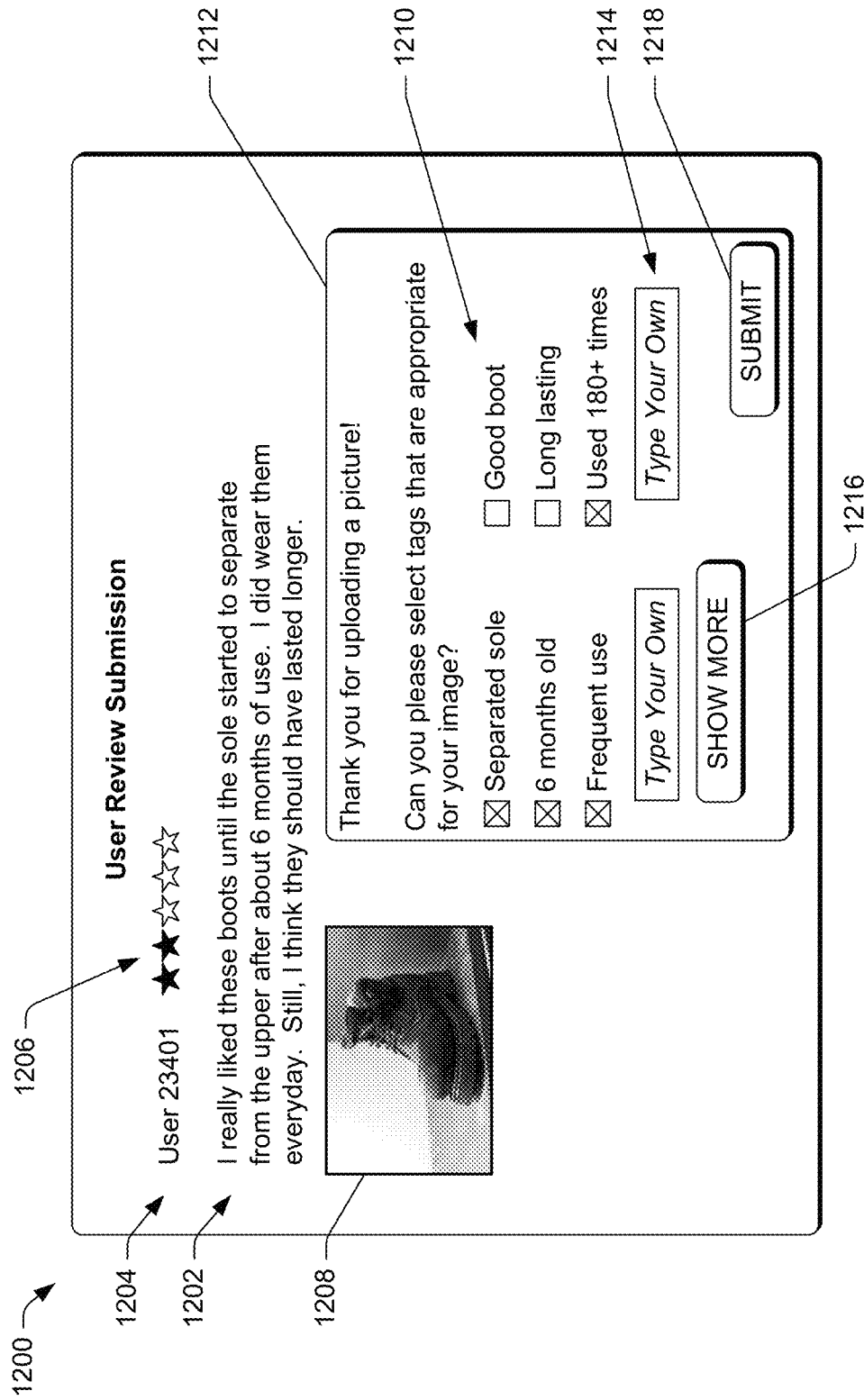
FIG. 12 shows an illustrative UI that includes a user input request to add tags to images for use in item-based reviews.

FIG. 12 shows an illustrative UI 1200 that includes a user input request to add tags to images for use in item-based reviews. The UI 1200 may include a review 1202 authored by a user 1204. The review may include a user rating 1206. At some point in the creation of the review 1202, the user 1204 may be offered an opportunity to upload a representative image 1208. In some embodiments, the offer to upload the image may not be presented until the review 1202 is at least partially entered. In various embodiments, the image-based review engine 120 may request the user to upload an image based on specific information included in the review 1202, such as information that may be helpful when provided visually in an image, such as a condition of a used item.

After uploading the image 1208, the image tagging module 210 may create sample tags 1210 for the image, which may be suggested to the user 1204 in a sub-interface 1212. The user 1204 may select tags that may best represent the image, that are accurate, and/or that otherwise appeal to the user. In some embodiments, the sub-interface 1212 may enable the user 1204 to enter tags in tag fields 1214 and/or request more tags using a "show more" command 1216. The sub-interface 1212 may include a "submit" command to submit the tags for association with the image. The item tagging module 210 may then include the tags or otherwise associate the tags with the image as discussed above. Other techniques may be used, in addition or alternatively, to add tags to images.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   receiving an image that depicts a used item and textual information associated with the image;
   associating one or more descriptive tags with the image based at least in part on the textual information associated with the image;
   determining a visual feature associated with the used item depicted in the image, wherein the visual feature includes at least one of a shape of the used item, a color of the used item, or a condition of the used item;
   associating one or more additional descriptive tags with the image based at least in part on the visual feature;
   determining usage data for the used item based at least in part on the one or more descriptive tags and the one or more additional descriptive tags, wherein the usage data indicates:
      a time period of use in which the used item was used, the time period of use beginning at a first time and ending at a second time at which the image was captured, the second time being subsequent to the first time;
      a frequency of use of the used item that indicates a frequency in which the used item was used during the time period of use; and
      a number of uses in which the used item was used during the time period of use;
   determining, by one or more computing devices, an estimated item age of the used item depicted in the image based at least in part on the usage data, the estimated item age being an amount of time between the first time and the second time;
   storing the image along with the one or more descriptive tags, the one or more additional descriptive tags, and the estimated item age in a storage device that includes images that depict the used item;
   organizing the images that depict the used item based at least in part on estimated item ages determined for corresponding items; and
   presenting the images that depict the used item in an item based review arranged by the estimated item age for view by a potential customer, the images depicting wear of the used item over time during the time period of use.

2. The method as recited in claim 1, further comprising modifying the image by at least one of adding a marker to the image to identify a location of the used item or cropping the image to remove extraneous imagery.

3. The method as recited in claim 1, further comprising:
   normalizing the estimated item age based at least in part on the usage data.

4. The method as recited in claim 1, further comprising, in response to selection of the image in the item based review, presenting at least one of the textual information associated with the image or the one or more descriptive tags and the one or more additional descriptive tags associated with the image.

5. The method as recited in claim 1, further comprising presenting the images in the item based review in association with a timeline, the images generally spaced apart along the timeline according to the estimated item age.

6. A method, comprising:
   receiving one or more images that depict an item, at least some of the one or more images associated with text associated with the item;
   analyzing the one or more images using an image classifier;
   determining, based at least in part on analyzing the one or more images using the image classifier, one or more visual features in the one or more images that include at least one of a shape of the item, a color of the item, or a condition of the item;
   associating one or more tags with at least an individual image of the one or more images based at least in part on at least one of information in the text or the one or more visual features;
   determining usage data associated with the item depicted in the individual image based at least in part on the one or more tags, wherein the usage data indicates at least one of:
      a time period of use in which the item was used, the time period of use beginning at a first time and ending at a second time at which the individual image was captured, the second time being subsequent to the first time;
      a frequency of use of the item that indicates a frequency in which the used item was used during the time period of use; or
      a number of uses in which the item was used during the time period of use;
   determining an estimated item age of the item depicted in the individual image based at least in part on the usage data, the estimated item age being an amount of time between the first time and the second time;
   organizing the one or more images based at least in part on at least one of the one or more tags, the usage data, or the estimated item age; and
   presenting the one or more images in a user interface as an image based review that is separate from the text associated with the item.

7. The method as recited in claim 6, wherein the visual features further include an additional item depicted in the one or more images.

8. The method as recited in claim 6, further comprising:
   determining user account data associated with the item that indicates at least one of a purchase date of the item, a delivery date of the item, or a shipment date of the item, wherein determining the estimated item age is further based at least in part on the user account data.

9. The method as recited in claim 8, further comprising normalizing the estimated item age based at least in part on the usage data.

10. The method as recited in claim 6, further comprising presenting the one or more images in the image based review in association with a timeline, the one or more images generally spaced apart along the timeline according to the estimated item age.

11. The method as recited in claim 6, further comprising extracting the one or more images from at least one of a social network site, a blog site, or a photography site to populate a storage device in which the one or more images are stored.

12. The method as recited in claim 6, wherein organizing the one or more images further comprises organizing the one or more images using at least one of a user rating or a user sentiment included in the one or more tags.

13. The method as recited in claim 6, further comprising:
analyzing the one or more tags; and
identifying at least a first condition and a second condition of the item based at least in part on analyzing the one or more tags, and wherein organizing the one or more images further comprises organizing the one or more images based at least in part on the first condition and the second condition.

14. The method as recited in claim 6, further comprising modifying an image of the one or more images to include a marker that identifies a location of the item depicted in the image.

15. A system comprising:
a storage device to store images;
one or more processors; and
memory storing computer executable instructions that, when executed, cause the one or more processors to:
receive an image that depicts an item;
identify text associated with the image that describes a condition of the item in the image;
analyze the image using an image classifier to identify a visual feature in the image, wherein the visual feature includes at least one of a shape of the item, a color of the item, or a visual condition of the item;
associate one or more tags with the image based at least in part on at least one of the text associated with the image or the visual feature in the image;
determine usage data associated with the item based at least in part on the one or more tags, wherein the usage data indicates at least one of:
a time period of use in which the item was used, the time period of use beginning at a first time and ending at a second time at which the image was captured, the second time being subsequent to the first time;
a frequency of use of the item that indicates a frequency in which the item was used during the time period of use; or
a number of uses in which the item was used during the time period of use;
determine an estimated item age of the item depicted in the image based at least in part on the usage data, the estimated item age being an amount of time between the first time and the second time;
organize the image and one or more other images that depict the item based at least in part on at least one of the one or more tags, one or more other tags associated with the one or more tags, the usage data, or the estimated item age; and
generate an item based review of the item using the image and the one or more other images.

16. The system as recited in claim 15, wherein the visual feature further includes an additional item depicted in the image.

17. The system as recited in claim 15, wherein the computer executable instructions cause the one or more processors to determine user account data associated with the item that indicates at least one of a purchase date of the item, a delivery date of the item, or a shipment date of the item,
wherein determining the estimated item age is further based at least in part on the user account data.

18. The system as recited in claim 15, wherein the image and the one or more other images are organized based at least in part on the estimated item age, and wherein the item based review shows the condition of the item with respect to time or the number of uses.

19. The system as recited in claim 15, wherein at least one of the one or more other images or the one or more other tags are extracted from at least one of a social network site, a blog site, or a photography site.

20. The system as recited in claim 15, wherein the computer executable instructions cause the one or more processors to:
analyze the one or more tags; and
identify at least a first condition and a second condition of the item based at least in part on analyzing the one or more tags, wherein the image and the one or more other images of the item are organized based at least in part on the first condition and the second condition of the item, and wherein the item based review includes groupings of images that are based at least in part on the first condition and the second condition of the item.

* * * * *